(12) United States Patent
Reyes et al.

(10) Patent No.: US 11,634,284 B1
(45) Date of Patent: Apr. 25, 2023

(54) DRY BRUSH CONVEYOR BELT CLEANING DEVICE AND SYSTEM

(71) Applicants: Evan Reyes, Stamford, CT (US); Victor A. Ceci, Stamford, CT (US)

(72) Inventors: Evan Reyes, Stamford, CT (US); Victor A. Ceci, Stamford, CT (US)

( * ) Notice: Subject to any disclaimer, the term of this patent is extended or adjusted under 35 U.S.C. 154(b) by 0 days.

(21) Appl. No.: 17/525,331

(22) Filed: Nov. 12, 2021

(51) Int. Cl.
*B65G 45/18* (2006.01)
*B65G 45/14* (2006.01)
*B65G 39/12* (2006.01)

(52) U.S. Cl.
CPC ............ *B65G 45/18* (2013.01); *B65G 39/12* (2013.01); *B65G 45/14* (2013.01)

(58) Field of Classification Search
CPC ......... B65G 45/18; B65G 45/14; B65G 39/12
See application file for complete search history.

(56) References Cited

U.S. PATENT DOCUMENTS

| | | | | |
|---|---|---|---|---|
| 2,403,374 A | * | 7/1946 | Kalmar | B65G 45/18 15/256.52 |
| 3,957,155 A | * | 5/1976 | Enchelmaier | B65G 45/18 198/496 |
| 4,044,420 A | | 8/1977 | Hanson | |
| 4,403,365 A | | 9/1983 | Hanson | |
| 5,400,897 A | * | 3/1995 | Doyle | B65G 45/18 198/860.5 |
| 5,779,024 A | | 6/1998 | Harper | |
| 5,784,752 A | * | 7/1998 | Barrett | B65G 45/18 15/88 |
| 6,601,692 B2 | | 8/2003 | Shaefer et al. | |
| 6,804,856 B2 | | 10/2004 | Udall | |
| 6,964,331 B1 | | 11/2005 | Kerr | |
| 9,248,975 B2 | * | 2/2016 | Handy | B65G 45/26 |
| 9,718,626 B2 | | 8/2017 | Urban | |
| 9,839,942 B1 | | 12/2017 | Phelps et al. | |
| 9,873,143 B2 | | 1/2018 | Arrington | |
| 11,059,077 B2 | | 6/2021 | Phelps et al. | |
| 11,485,585 B1 | * | 11/2022 | Bitondo | B65G 45/16 |
| 2021/0121041 A1 | | 4/2021 | Shmidt et al. | |

FOREIGN PATENT DOCUMENTS

| | | |
|---|---|---|
| CN | 105665327 B | 8/2018 |
| CN | 210277073 U | 4/2020 |
| KR | 200434204 Y1 | 12/2006 |
| KR | 20110119862 A | 11/2011 |
| KR | 101338089 B1 | 12/2013 |
| KR | 101894037 B1 | 9/2018 |

* cited by examiner

*Primary Examiner* — Mark A Deuble
(74) *Attorney, Agent, or Firm* — Gilbride, Tusa, Last & Spellane LLC; Todd S. Sharinn

(57) ABSTRACT

A cleaning device and system operable to a continuous conveyor is shown. The cleaning assembly is operable to clean debris from the continuous conveyer. The cleaning device comprises a cleaning assembly mounted below a lower conveyor belt. The cleaning assembly is pivotable to form an angle with respect to a direction of the lower conveyor run. The cleaning assembly has a removable cartridge having a shaft with a pair of ends and having a cylindrical cleaner mounted on said shaft.

67 Claims, 18 Drawing Sheets

DRY BRUSH CONVEYOR BELT CLEANING DEVICE AND SYSTEM

TECHNICAL FIELD

The present invention relates to systems and methods for cleaning conveyor belts; more particularly, to systems and methods for cleaning soft or fabric conveyor belts as may be used, for example, in the continuous food preparation and baking arts; and most particularly to a conveyor belt cleaner system employing a rotating brush cleaning mechanisms directed to removing certain known food allergens or chemicals that are often entrapped or ensnared on or in the conveyor belt during food preparation processing and where said food allergens or chemicals could later contaminate different products subsequently prepared using that same conveyor belt.

BACKGROUND OF THE INVENTION

The present invention is directed to the art of cleaning commercial conveyor belts and most notably commercial conveyor belts that are used in connection with the manufacture of various types of goods that may incorporate ingredients or components that under different circumstances could be considered contaminants, and sometimes dangerous, if cross contamination were to occur during the manufacturing or processing of other types of goods on the same conveyor belt subsequently.

In the prior art, conveyor belts used in various commercial activities are known to become soiled, typically with spillage from materials being conveyed or treated on the belt. It becomes desirable and necessary to clean at least the working upper surface of the belt. The need for such cleaning is heightened when for example food products, pharmaceuticals, and other indigestible items are the article of manufacture. The need is more crucial when the ultimate article of manufacture under preparation on the conveyor belt contains ingredients or components that if accidentally permitted to contaminate certain different articles of manufacture could result in harm and potentially death.

As manufacturing demands have increased, often the diversity of products manufactured on any given conveyor belt has similarly grown, and with it the laws governing and controlling product manufacturing and labelling, as well as regulating the processing and inclusion or exclusion of specific ingredients or components, by intent or accident. Thus there is an urgent need for improved means for effectively removing allergens and contaminants from the conveyor belts.

Historically, cleaning conveyor belts has been a burdensome task accomplished by installing a cleaning device in the path of the belt and allowing the belt to pass through the cleaning device, perhaps several times, until the extraneous material is removed. However, as discussed above, recent laws, requirements, and consumer expectations have increased the burden on manufacturers of food products, pharmaceuticals, and other ingestible goods, particularly those that produce multiple types of products, some of which may contain various types of allergens or the like that could cause adverse reactions if ingested or used by unsuspected consumers prone to such allergies or sensitivities, to make certain that their various products are properly labeled to identify the inclusion or exclusion of such particulates and to prevent the accidental contamination of their other products manufactured using the same conveyor belt.

U.S. Pat. No. 7,784,476 to Handy (the "'476 Patent") discloses and claims a portable cleaning system for cleaning a moving item such as an escalator or conveyor belt. The system comprises an overhead steam jet assembly slidably mounted on transverse rails for motion transverse to the direction of motion of the escalator or conveyor belt. The transverse rails are disposed between width-adjustable end pieces that rest on stationary outer members of the escalator. A shortcoming of this system is that the steam jet assembly is fixed at an angle transverse to the direction of motion of the conveyor belt and cannot be easily adjusted to an angle giving maximum cleaning efficiency. A further shortcoming is steam jet assembly is mechanically complex and difficult to maintain. Thus, replacing easily worn-out parts is difficult and time consuming. Perhaps, the most significant drawback presented by the system is its failure to address the removal of certain particulates (e.g., whole, crushed, or fragmented seeds and nuts, soybean particulate, wheat debris, egg debris, and fish or shellfish remains), which may become embedded in the surface conveyor belts. Indeed, it is likely that the mechanism of the assembly claimed in the '476 Patent would likely exacerbate these precise concerns.

U.S. Pat. No. 9,248,975 to Handy (the "'975 Patent") also discloses and claims a portable cleaning system for cleaning a moving item such as an escalator or conveyor belt. The system comprises an overhead steam jet assembly slidably mounted on transverse rails for motion transverse to the direction of motion of the escalator or conveyor belt. The transverse rails are disposed between width-adjustable end pieces that rest on stationary outer members of the escalator. As set forth in the '476 Patent, the steam jet assembly is mechanically complex making replacement of worn-out parts difficult and time consuming. Further, the orientation of the steam jet assembly above the belt does not provide sufficient cleaning for food debris as the food may become lodged in the lower run of a conveyor. Perhaps, the most significant drawback presented by this system is its failure to address the removal of certain particulates (e.g., whole, crushed, or fragmented seeds and nuts, soybean particulate, wheat particulate, egg debris, and fish or shellfish remains), which may become embedded in the surface conveyor belts. Indeed, it is likely that the mechanism of the assembly claimed by the '975 Patent would likely exacerbate these precise concerns.

U.S. Pat. No. 10,150,623 to Handy (the "'623 Patent") discloses and claims a cleaning apparatus comprising a connection part permitting connection to a supply of cleaning fluid, and a rotatable member rotatably movable relative to the connection part, the rotatable member being in a form of a disc with an opening within the disc in connection with the connection part to receive cleaning fluid therefrom, with one or more outlets extending from the opening in the disc, to an exterior of the disc, to supply cleaning fluid to an area or item to be cleaned, wherein the rotatable member is made of a plastics material, and wherein the rotatable member is driven by a gear provided on the rotatable member and the gear is drivable by a motor. A shortcoming of the '623 system is that the rotatable gear and motor assembly require that the cleaning apparatus remain in a fixed position. A further shortcoming of this system is that the rotatable disc requires a gear transmission and electric motor, thereby increasing the complexity of the cleaning mechanism and making maintenance and replacement time-consuming and labor intensive. Perhaps, the most significant drawback presented by this system is its failure to address the removal of certain particulates (e.g., whole, crushed, or fragmented seeds and nuts, soybean particulate, wheat debris, egg debris, and fish or shellfish remains), which may become embedded in the surface conveyor belts. Indeed, it is likely that the mechanism of the assembly claimed by the '623 Patent would likely exacerbate these precise concerns.

U.S. Pat. No. 9,718,626 to Urban (the "'626 Patent") discloses and claims a cleaning mechanism for use with a closed loop conveyor belt supported in continuous traversing fashion, said mechanism comprising: a housing for supporting the belt; a frame mounted to said housing proximate to the belt; a drive shaft extending between spaced apart locations of said frame and including a pair of head sprockets adapted for supporting the belt at a selected location; a motor engaging said drive shaft; and a slave shaft extending between additional spaced apart location of said frame and which is rotated via a linkage with said drive shaft, wherein first and second sprocket wheels secured respectively to extending ends of said drive shaft and slave shaft, a chain interconnecting said sprocket wheel for transferring rotational momentum of said drive shaft to said slave shaft. A shortcoming of the '626 patent is that it is a complex and cumbersome mechanism making it difficult to change orientation with respect to a cleaning belt and replacing crucial parts is time consuming and costly. Perhaps, the most significant drawback presented by this system is its failure to address the removal of certain particulates (e.g., whole, crushed, or fragmented seeds and nuts, soybean particulate, wheat particulate, egg debris, and fish or shellfish remains), which may become embedded in the surface conveyor belts. Indeed, it is likely that the mechanism of the assembly claimed by the '626 Patent would likely exacerbate these precise concerns.

U.S. Pat. No. 6,964,331 to Kerr (the "'331 Patent") discloses and claims a conveyor apparatus comprising: a support; a pair of pulleys carried by said support; an endless conveyor belt having upper and lower runs extending around said pulleys; first power means for driving one of said pulleys and said conveyor belt; a cantilever mounted rotary brush conveyor belt cleaner assembly mounted on one side of said support and extending below the lower run of said conveyor belt, said rotary brush conveyor belt cleaner assembly having a shaft with a pair of ends, and a rotary brush mounted on said shaft; a bearing support assembly supporting one end of said shaft, with the other end of said shaft being unsupported; said rotary brush and shaft extending transversely across and below said lower run for engaging and cleaning the lower run of said endless conveyor belt when driven by said first power means; and second power means for rotating said shaft and said rotary brush. A shortcoming of the '331 patent is that the bearing support assembly fixes the shaft in place making reorientating the cleaning element a time-consuming and labor-intensive and expensive task. Perhaps, the most significant drawback presented by this system is its failure to address the removal of certain particulates (e.g., whole, crushed, or fragmented seeds and nuts, soybean particulate, wheat debris, egg debris, and fish or shellfish remains), which may become embedded in the surface conveyor belts. Indeed, it is likely that the mechanism of the assembly claimed by the '331 Patent would likely exacerbate these precise concerns.

While, as explained earlier, numerous commercial systems exist in the prior art for cleaning escalators and conveyor belts, (e.g., the KHD Brushless Belt Cleaning System; the Therma-Kleen Conveyor Belt Cleaner; the Amerivac-Houdini Belt Cleaning System; the Electrosteam-Belt Cleaning System; the Dupray Belt Cleaning System; and the Mekini Belt Cleaning System, which are the subjects of the '476, '975, '623, '626, and '331 Patents respectively), each of them are unable to address the specific needs presented herein for several reasons. Most notably, the most significant drawback presented by these systems is their failure to address the removal of certain particulates (e.g., whole, crushed, or fragmented seeds and nuts, soybean particulate, wheat debris, egg debris, and fish or shellfish remains), which may become embedded in the surface conveyor belts. Indeed, it is likely that the mechanism of these known assemblies would likely exacerbate these precise concerns.

What is needed in the art is a conveyor belt cleaning system for cleaning the working surface of continuous belts formed of a flexible material such as plastic or fabric, used for example, in the continuous preparation of food products, pharmaceuticals, and other ingestible products. The desired conveyor belt cleaning system will provide a means for such manufacturers of food products, pharmaceuticals, and other ingestible goods, and most notably those that produce multiple types of products, where some of such products may contain various types of allergens or the like that could cause adverse reactions if ingested or used by unsuspected consumers prone to such allergies or sensitivities to prevent the accidental contamination of their other products manufactured using the same conveyor belt through the effective removal of such contaminants and allergens. Further, what is needed in the art is such a conveyor belt cleaning system wherein the cleaning elements can be adjusted to increase efficacy in the removal of certain known food allergens or chemicals that are often entrapped or ensnared on or in the conveyor belt during food preparation processing and could later contaminate different products subsequently prepared using that same conveyor belt.

SUMMARY OF THE INVENTION

The present invention teaches a cleaning device for a continuous conveyor. The cleaning device comprises a cleaning assembly that may be mounted below a lower conveyor belt, a cleaning assembly mounted above a higher conveyor belt, or a plurality of cleaning assembles mounted both below the lower conveyor belt and above the higher conveyor belt. The cleaning assembly is pivotable to form an angle with respect to a direction of the lower conveyor run and is operable to clean debris from the continuous conveyer. The cleaning assembly has a removable cartridge having a shaft with a pair of ends and having a cylindrical cleaner mounted on the shaft, the cylindrical cleaner in contact with the lower conveyor being run at the angle of the cleaning assembly. Also present is a cleaning rod in contact with the cylindrical cleaner.

In another embodiment of the present invention, the removable cartridge can indicate the type of the cylindrical cleaner and cleaning rod. Further, the use of cylindrical cleaner can be indicated on the cartridge. Preferably, the cylindrical cleaner comprises a brush having a cylindrical shaft and brush (bristle) elements extending in helical arrangement. The cylindrical cleaner may be driven by means of friction from contact with the cleaning belt or by means of a motor.

The present invention also teaches a system for cleaning a continuous conveyor. A continuous conveyor having an upper conveyor run and a lower conveyor run is provided. A cleaning assembly is mounted below said lower conveyor run. The cleaning assembly is pivotable, for example, by an operator using mechanical means to form an angle with respect to a direction of the lower conveyor run, which permits the easy adjustment so as to enhance the device's cleaning capacity depending on several factors including size and material of conveyors, type and size of particulate matter, and quantity of debris. Present in the cleaning assembly is a removable cartridge having a shaft with a pair of ends and having a cylindrical cleaner mounted on said shaft. The cylindrical cleaner is in contact with said lower conveyor run at the angle of the cleaning assembly. To aid in removing particulate matter, a cleaning rod in contact with said cylindrical cleaner is also provided.

A method for cleaning a continuous conveyor having an upper conveyor run and a lower conveyor run is also provided. A cleaning assembly is mounted below the lower conveyor run. The cleaning assembly is pivoted to form an angle with respect to a direction of the lower conveyor run. A removable cartridge having a shaft with a pair of ends and having a cylindrical cleaner mounted on said shaft is inserted into the cleaning assembly so that the cylindrical cleaner is in contact with said lower conveyor run at the angle of the cleaning assembly. A cleaning rod is also in contact with said cylindrical cleaner. Activating the continuous conveyor then causes the cylindrical cleaner to rotate and to thereby remove particulate matter from the lower conveyor run by scrubbing action.

DETAILED DESCRIPTION OF THE INVENTION

Throughout the following description, specific elements are set forth to provide a more thorough understanding of the invention. However, in some embodiments the invention may be practiced without some of these elements. In other instances, well known elements have not been shown or described in detail to avoid unnecessarily obscuring the disclosure. Accordingly, the specification and drawings are to be regarded as illustrative rather than restrictive. It is to be further noted that the drawings may not be to scale for all applications of the system and components disclosed and claimed hereby.

Figure 1:
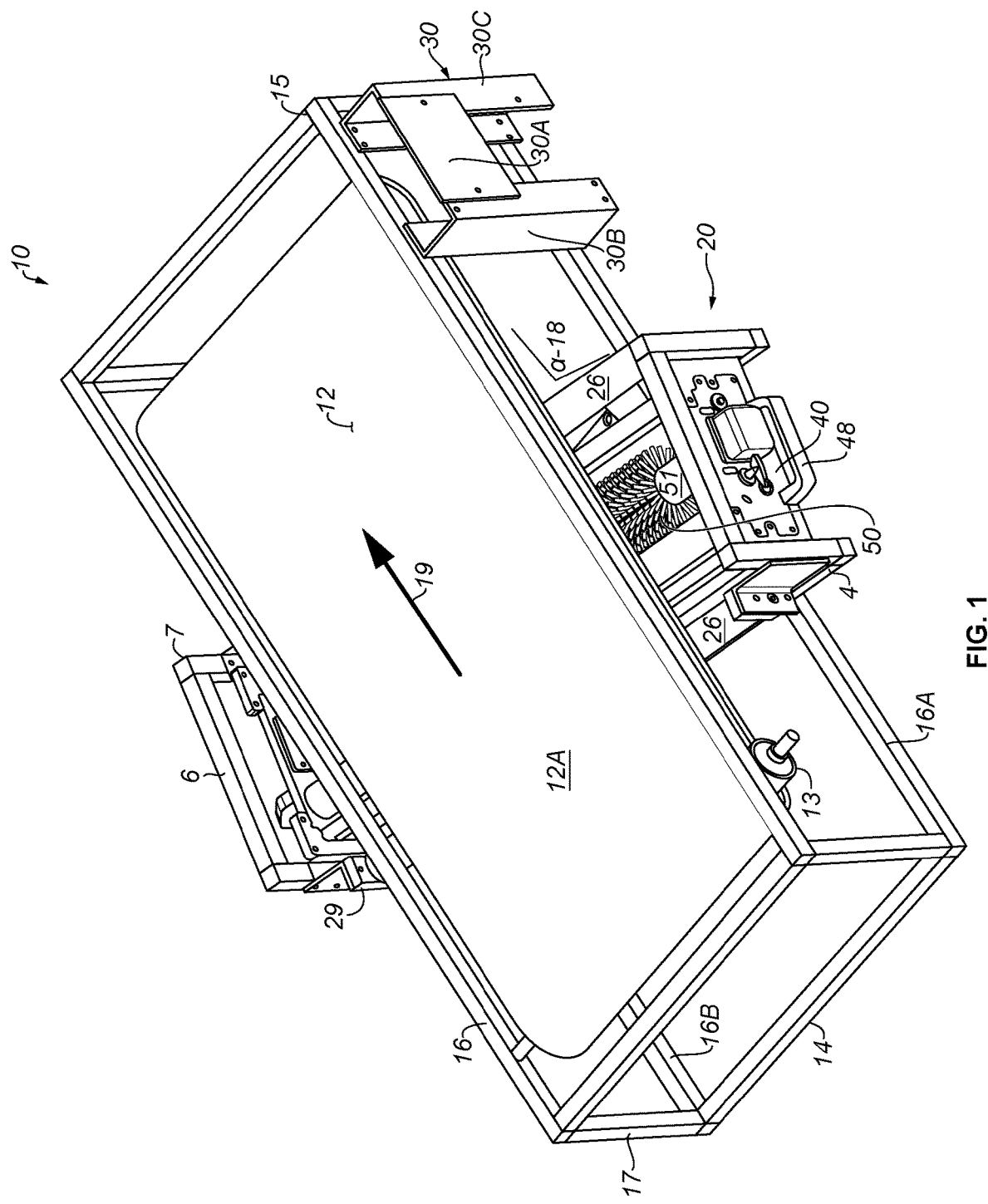
FIG. 1 is an isometric top view of the dry brush conveyor cleaning belt system showing the cleaning assembly and continuous conveyor belt.
Figure 2:
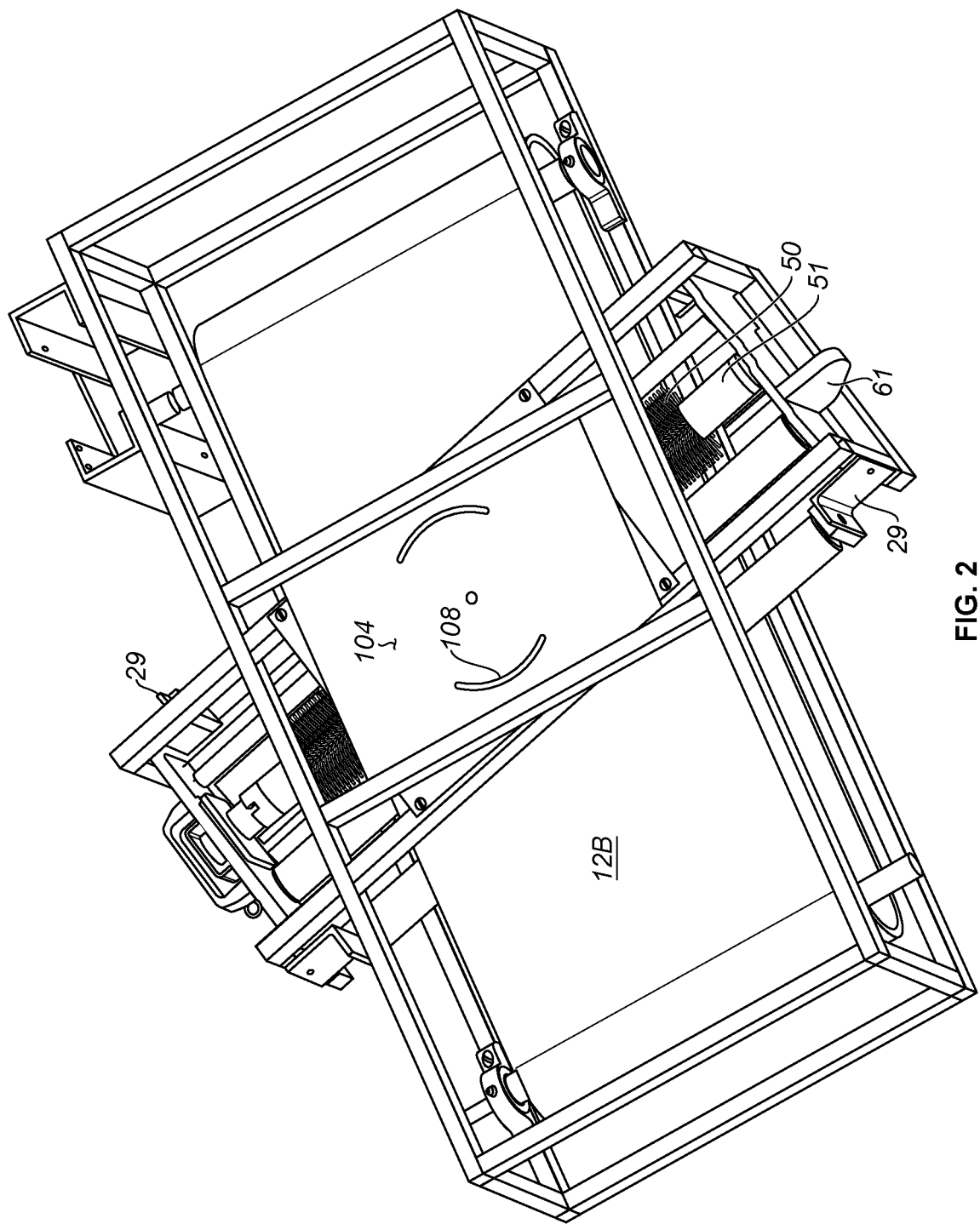
FIG. 2 is an isometric bottom view of the dry brush conveyor cleaning belt system showing the lateral pivot assembly.
Figure 3:
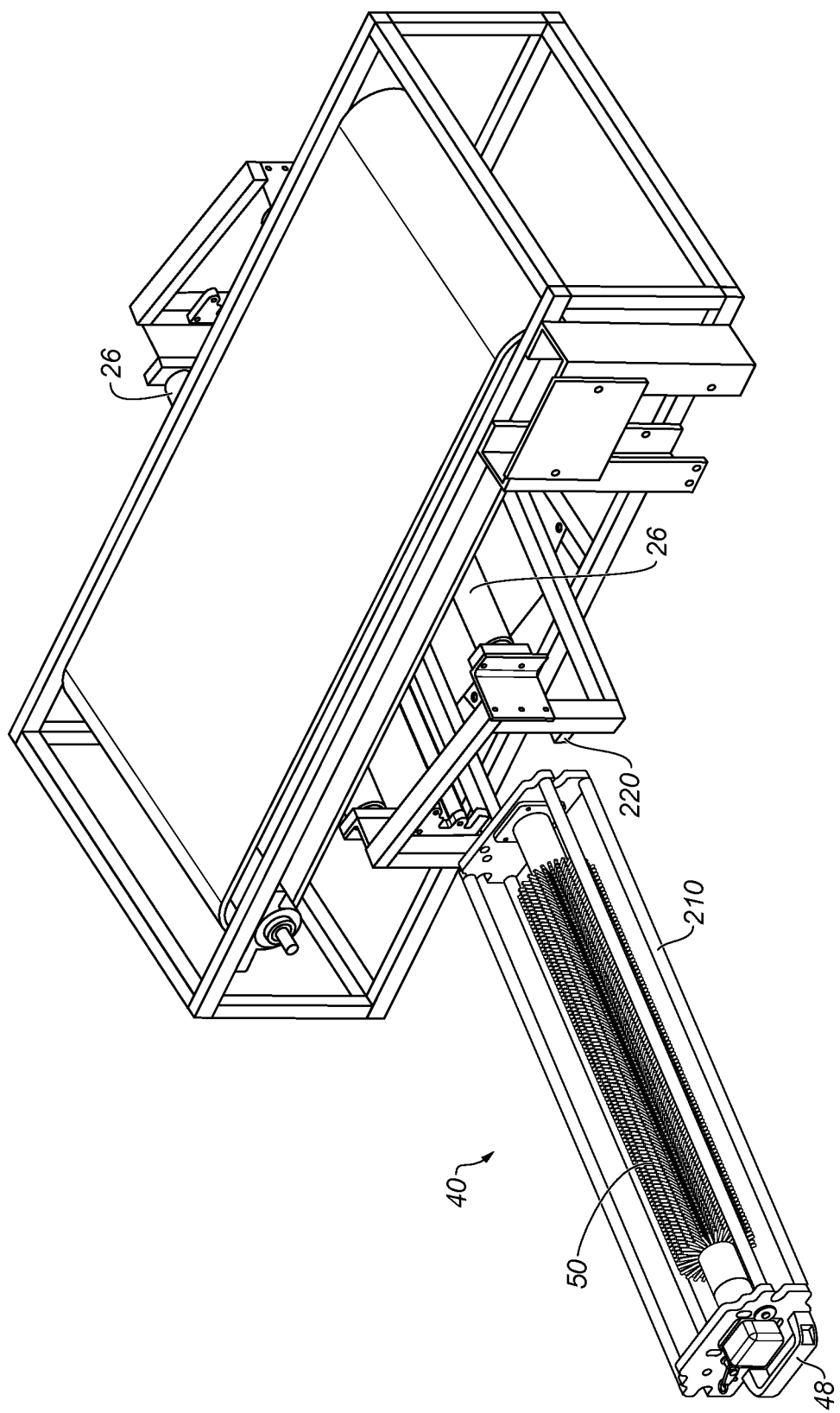
FIG. 3 is schematic illustration of the conveyor cleaning belt system with a removable cartridge removed.

With respect FIGS. 1-3, a conveyor belt cleaner system in accordance with the present invention comprises a base assembly 10 including a plurality of transverse 14(a-d), longitudinal 16(a-d) and vertical 17(a-d) struts forming a rectangular assembly supporting a conveyor belt 12 and rollers 13,15. Two of the lower longitudinal struts 16(a,b) are supportive of a laterally pivoting assembly 20. Laterally pivoting assembly 20 itself is comprises a second set of transverse 4(a,b), longitudinal 6(a,b) and vertical 7(a,b) struts to form a rectangular structure. Laterally pivoting assembly 20 is positioned at a variable angle 18 disposed transversely to the direction of travel of a conveyor belt 12. The conveyor belt is shown having a continuous belt with an upper conveying run 12a and a lower return run 12b. The laterally pivoting assembly 20 is disposed preferably beneath a length of the lower return run 12b, although disposition of assembly 20 above the conveyor on conveyor run 12a is fully contemplated by the present invention. The conveyor belt 12 is guided over and by a first and second roller 13, 15, for example, drive rollers. The rollers 13,15 are disposed transversely to the belt 12 at each end of the belt 12. The continuous belt is shown rotating in a clockwise motion 19. The second roller 15 is operatively engaged to a support housing 30 at a formed first support plate 30a. The first support plate is affixed to a formed second 30b and third 30c support plate. The second 30b and third plate 30c are in turn affixed to transverse struts 16.

An axially rotating cylindrical cleaner 50 is mounted on a drive shaft 51 that extends transversely below the return run 12b. The cleaner 50 is mounted between the pair of pinch rollers 26 (shown in greater detail in FIG. 3) and arranged one at either side of the cleaner 20, with each roller 26 rotatably secured to the pivoting assembly by a formed support L-beams 29(a-d). The pinch rollers 26 urge the underside of the return run 12b towards axis of the cleaner 50 and thereby press the axial distal ends of the cleaner 50 into cleaning contact with the underside of the return run 12b. The contact of the cleaner 50 with the underside of the return run 12b produces a cleaning action that removes debris and particulate matter from the run 12. Such debris could include food matter such as sesame seeds, peanuts whole, crushed, or fragmented seeds and nuts, soybean particulate, wheat particulate, egg debris, fish or shellfish remains, and/or other allergens.

In an embodiment of the present invention, a friction wheel is used to change the speed of rotation relative to the run, thereby producing a more efficient cleaning action. In some embodiments, a plurality of cleaner 50s could be used as shown, for example, in FIG. 11

In a non-limiting example, the cleaner 50 is driven by the friction from contact between the distal ends of the cleaner 50 and conveyor belt 12. The drive from the conveyor belt 12 is conveyed to the cleaner 50, thereby causing the shaft 51 to rotate. The clockwise rotation of the cleaning elements of cleaner 50 comprises a linear motion at their tips and provides a vigorous and efficient cleaning operation of the underside of the return run 12b.

Figure 14:
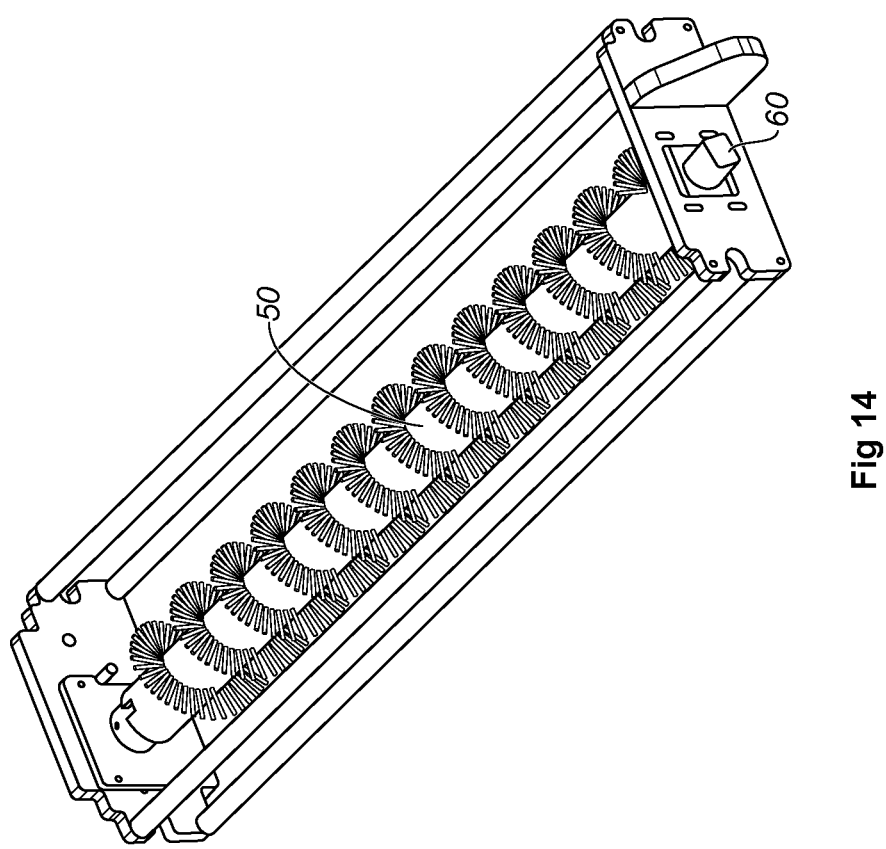
FIG. 14 shows an isometric view of the cartridge with a first motor affixed.
Figure 15:
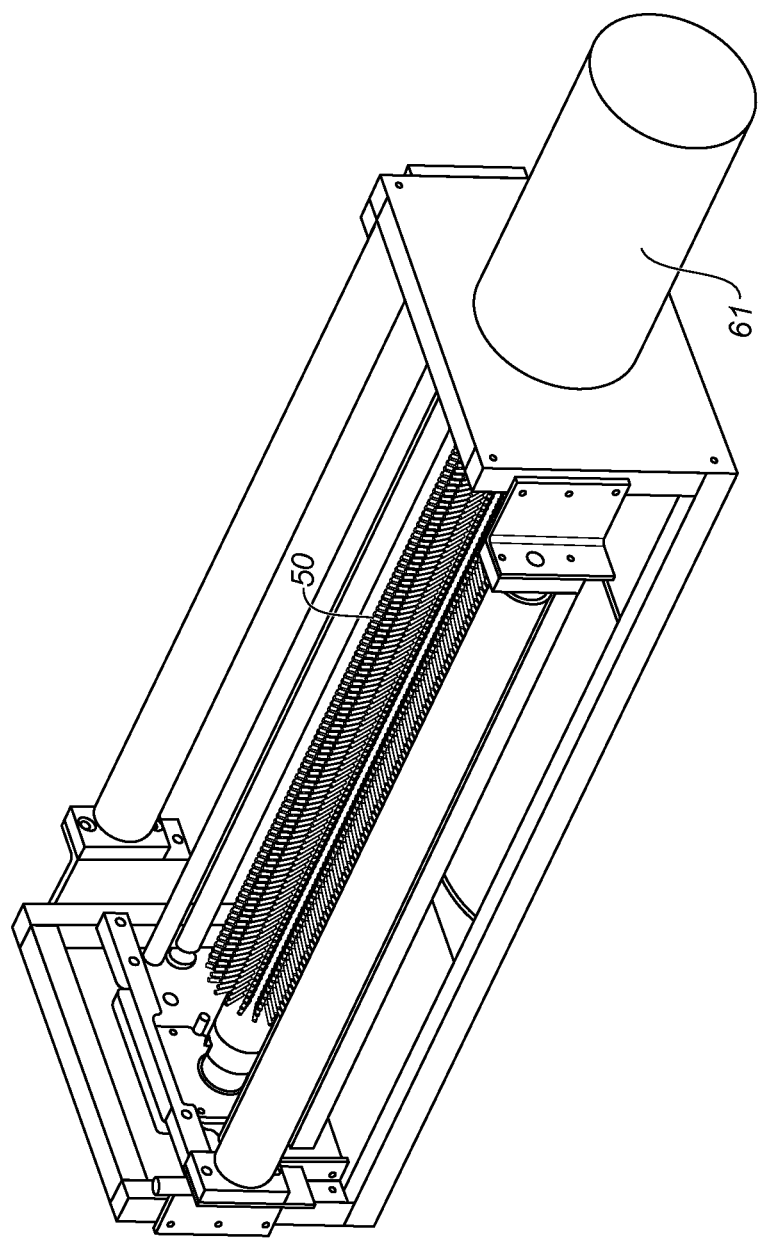
FIG. 15 shows an isometric view of the cartridge with a second motor affixed.

In an alternative embodiment as shown in FIGS. 14 and 15, the drive shaft 51 of the cleaner 50 is driven by a first or second motor 60,61 thereby powering the cleaner 50 and causing it to rotate. The drive from the motor 60,61 may be imparted to the axis of the cleaner 51 causing the cleaner 50 to axially rotate either clockwise or counterclockwise and at differing adjustable speeds, e.g., selected by an operator's input.

A bristle cleaning rod 54 (shown in greater detail in FIG. 3) is mounted parallel to the axis of and in contact with the cleaner 50. The removable rod slides into a slot and can be affixed by a bolt. The contact of the cleaner 50 with the cleaning rod 54 thereby removes debris from the cleaner 50. Said debris are then laterally discharged.

The laterally pivoting assembly 20 houses the pinch rollers 26, and a removable cartridge 40 housing the cleaner 50 and cleaning rod. The laterally pivoting assembly 20 is operable to laterally pivot over a vertical axis to permit adjustment of the angle 18 of the cleaner 50 in relation to the conveyor run 12. The angle 18 can range from perpendicular to parallel to the direction of travel. The angle 18 thereby prevents wear from accumulating at the same location of the cleaner or in the same direction on the run 12. Further, the angle 18 of cleaning contact may be used to increase efficacy in removal of varying debris. By way of example as shown in FIG. 2, the pivot could be achieved by a lateral pivoting assembly 20 having a pivot subassembly 104 affixed to the continuous conveyor assembly mated to a second plate 106 affixed to the laterally pivoting assembly 20.

In embodiments of the present invention, the angle 18 could, for example, be adjusted or a cleaner 50 could be chosen to specifically remove sesame seeds with increased efficiency.

Preferably, the lateral pivoting assembly 100 has a pivot travel guide 108 formed by two semicircular depressions on the second plate 106 mated with a matching extended area on the pivot subassembly 104. A belt lift cam 61 extends distally from the laterally pivoting assembly 20 and acts to provide an upward vertical force to a potentially sagging run.

A removable cartridge (shown removed in FIG. 3) 40 housing the cleaner 50 and rod 54 can be receivingly and removably engaged to the laterally pivoting assembly 20 by a manual means, such as a handle 48. A male flange 210, (e.g., a rail), mates with a female flange 220 to allow the cartridge 40 to be removed from and replaced into the cleaning assembly 10. A sweeping action of the cleaner at the angle of contact with the run generates lateral kinetic friction thereby securing the cartridge in place.

Preferably a helical or auger cleaner shape is used to increase the lateral kinetic friction. In another embodiment, rotating cleaner 50 and the angle at which the cleaner 50 intersect the conveyor belt 12 impart a downward force on the cartridge 40 by the friction thus generated from the angle and contact of the cleaner 50 and the moving conveyor belt 12, thereby further securing the removable cartridge 40 in the laterally pivoting assembly 20. In other embodiments of the present invention, the removable cartridge 40 can also be secured in the assembly by use of a latch and clasp, snap, or other methods known in the art.

As noted hereinabove, a common problem in prior art conveyor belt cleaners is that the cleaner is difficult and time-consuming to replace. In the present invention, however, the removable cartridge 40 is removable by an operator and can be secured without the use of any specialized device by a handle 48. The operator can thereby easily replace or reconfigure the cleaner 50 and rod 54. Each removable cartridge 40 can be fitted with cleaner 50 and rod 54 arrangements to more efficaciously remove debris. For example, a first arrangement could comprise a cleaner 50 and rod 54 configuration to remove sesame seed and debris more efficaciously, while a second arrangement could comprise a second cleaner 50 and rod 54 to more efficaciously remove, for example, peanut debris.

In another embodiment of the present invention, the cleaner 50 and removable cartridges 40 could be of differing colors to distinguish a particular usage. For example, a blue removable cartridge 40 comprising a first cleaner 50 and rod 54 combination could be used to remove sesame seeds, while a red removable cartridge 30 comprising a second cleaner 50 and rod 54 combination could be used to remove peanuts. Preferably, the removable cartridges could also display a warning or label displaying a type of contaminant or allergen so as to further avoid the opportunity for accidentally confusing one for another.

Figure 4:
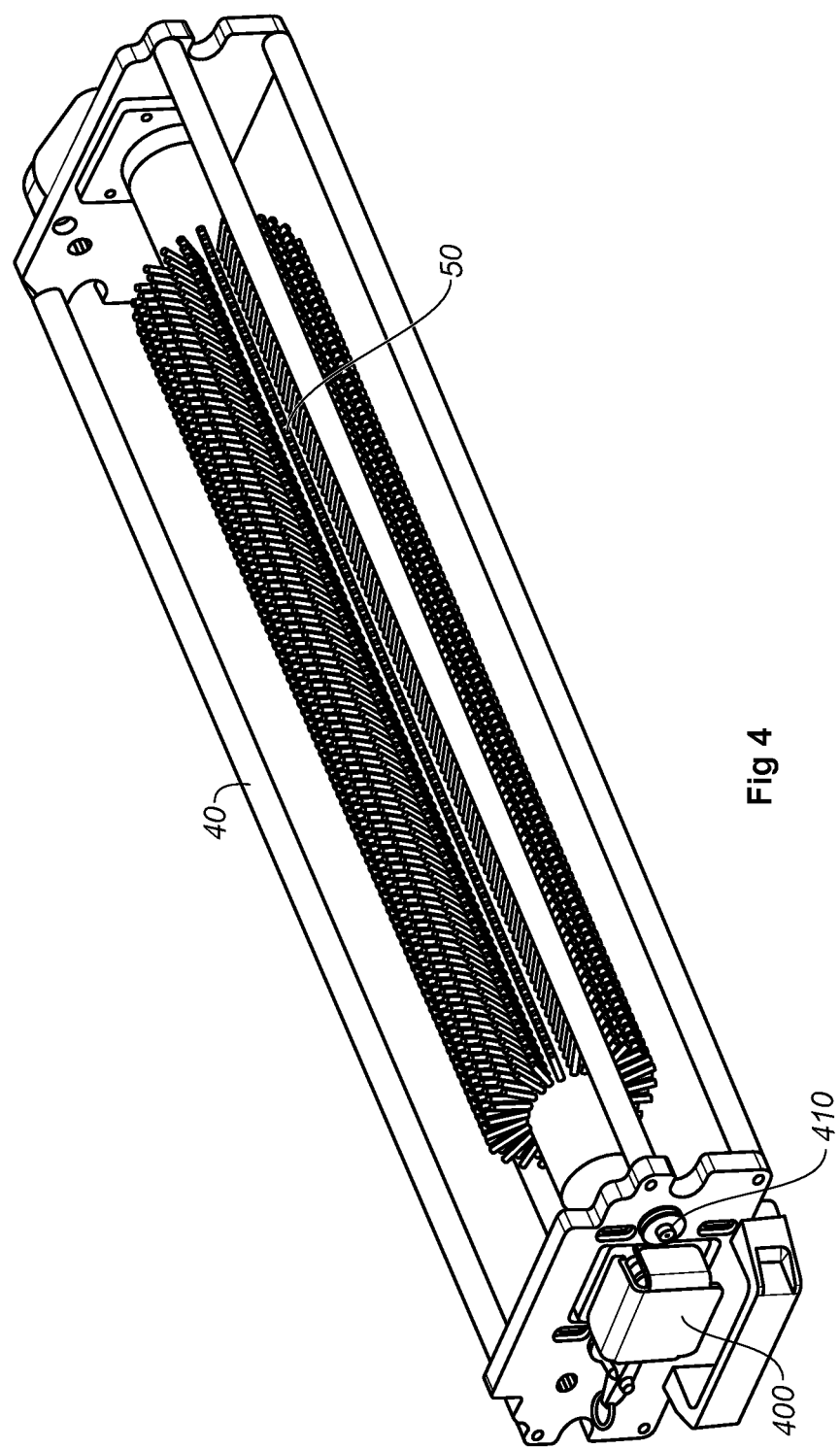
FIG. 4 is an isometric top view of the removable cartridge assembly.
Figure 5:
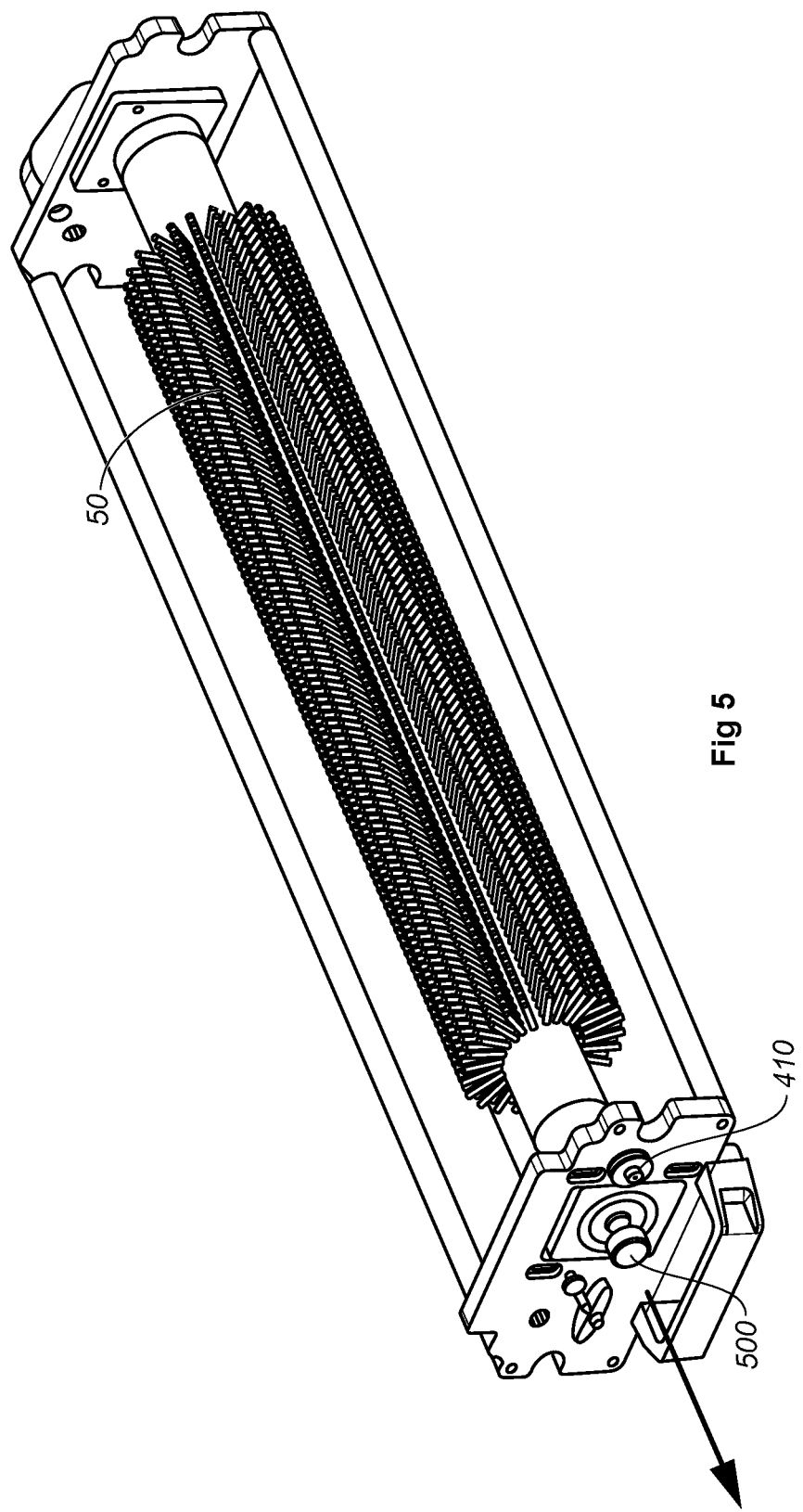
FIG. 5 is a schematic view of the cartridge assembly showing the slide out brush assembly

Referring to FIGS. 4 and 5, a cleaner cover 400 on the removable cartridge 40 is easily removable by an operator. Once removed, a cleaner handle 500 allows an operator to manually slide the cleaner 50 into and out of the removable cartridge 40. The cleaner 50 could then be cleaned and reused or replaced with a new cleaner 50. A rod securing assembly 410 is also shown for manually removing and replacing the rod. Preferably, a bolt assembly secures the rod in place.

Figure 6:
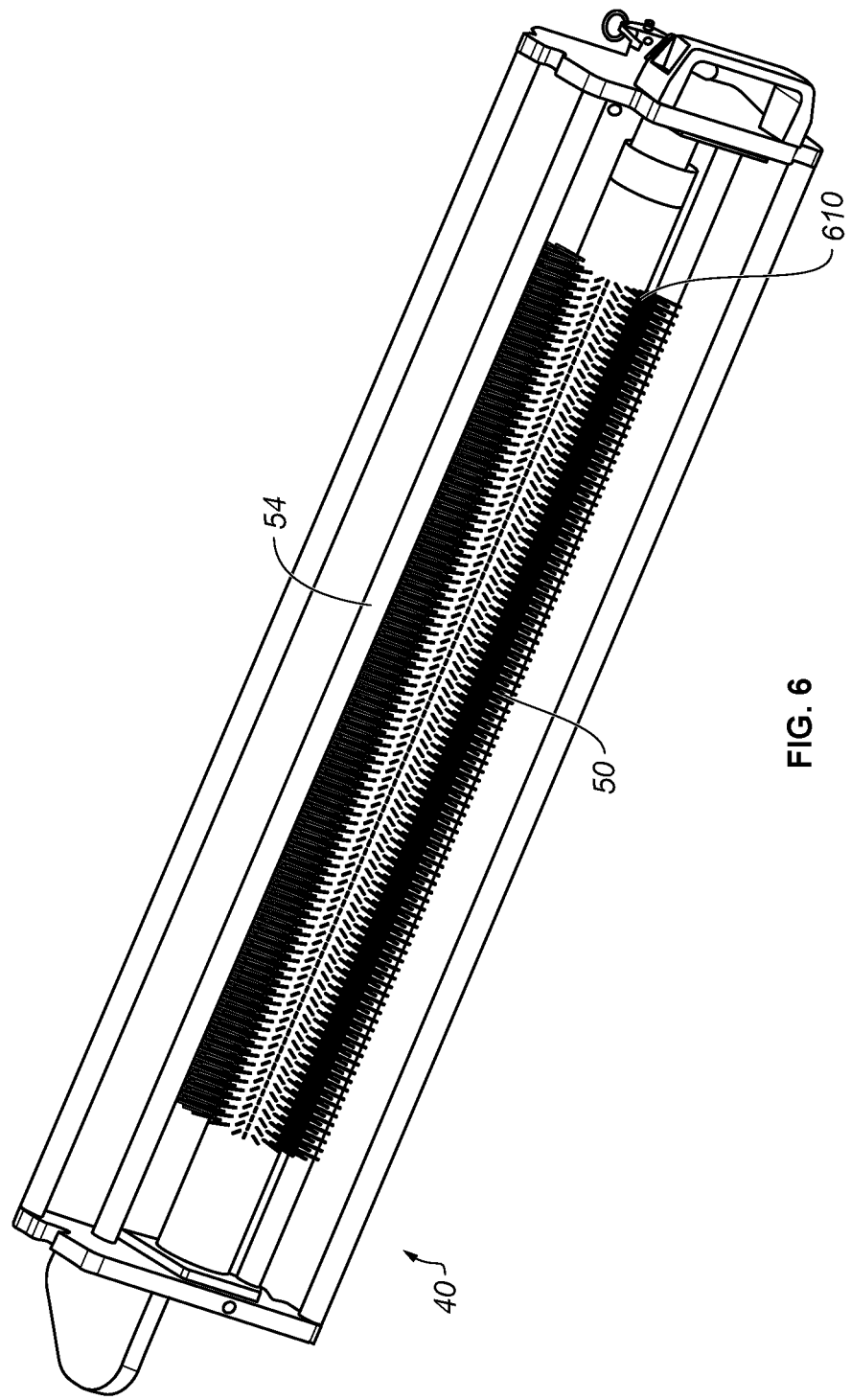
FIG. 6 is a sectional view of the removable cartridge assembly showing the bristle cleaning rod.
Figure 7:
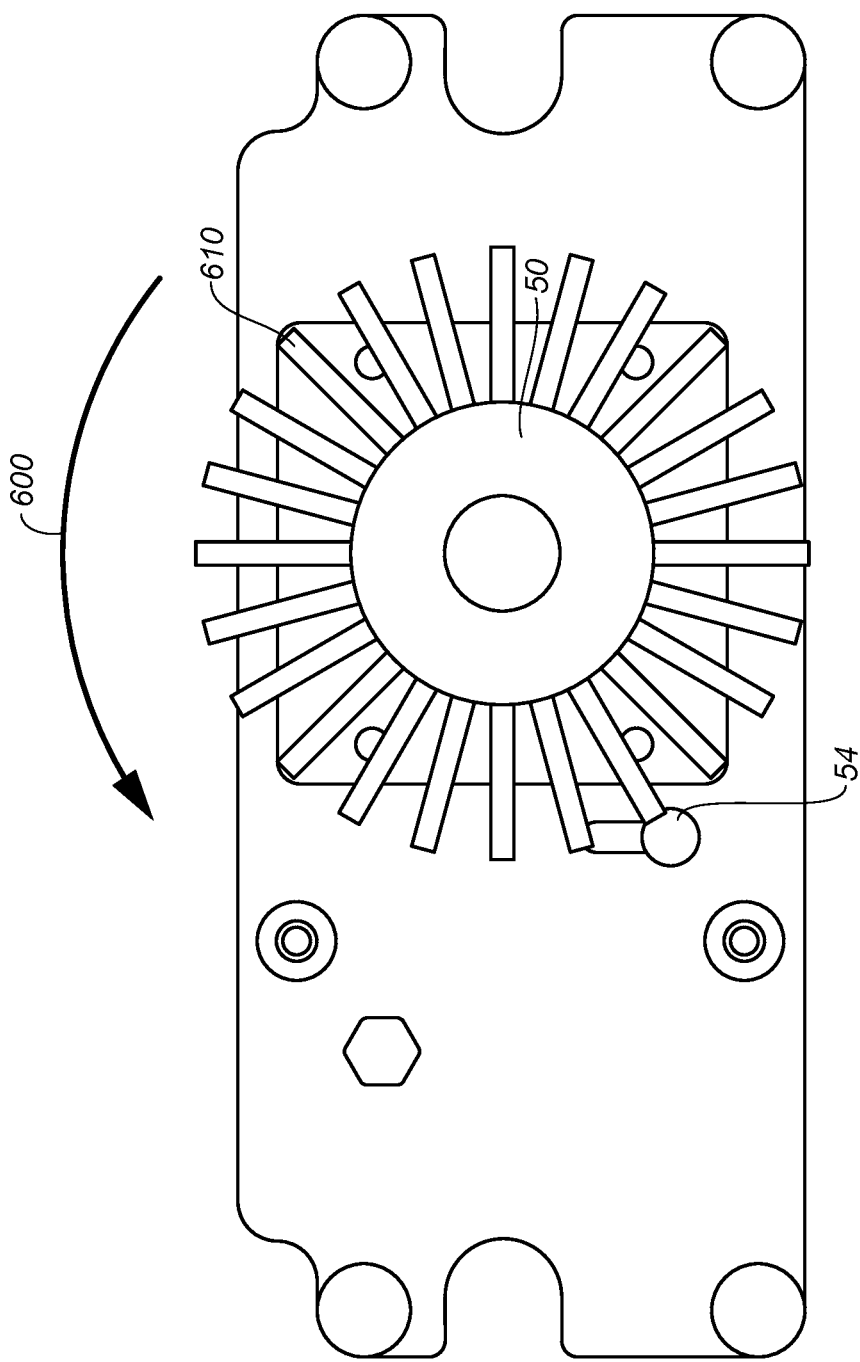
FIG. 7 is a schematic illustration of the bristle cleaning rod interacting with the cleaning elements.

With reference to FIG. 6, the rod 54 is shown affixed longitudinally to cleaner 50 in the removable cartridge 40. Extending distally from the cleaner 50 are a plurality of cleaning elements or bristles 610. As shown in FIG. 7, the counter-clockwise rotation 600 of the cleaner 50 brings the distal ends of the cleaning elements 610 into contact with the rod 54. The rod 54 thereby bends the bristle ends clockwise generating potential energy. After the rotation of the cleaner 50 causes the cleaning elements 610 to lose contact with the cleaner 50, the cleaning elements 610 rapidly release the potential thus generated and return to their original position, thereby ejecting any debris and particulate matter lodged in the cleaning elements 610.

Figure 8:
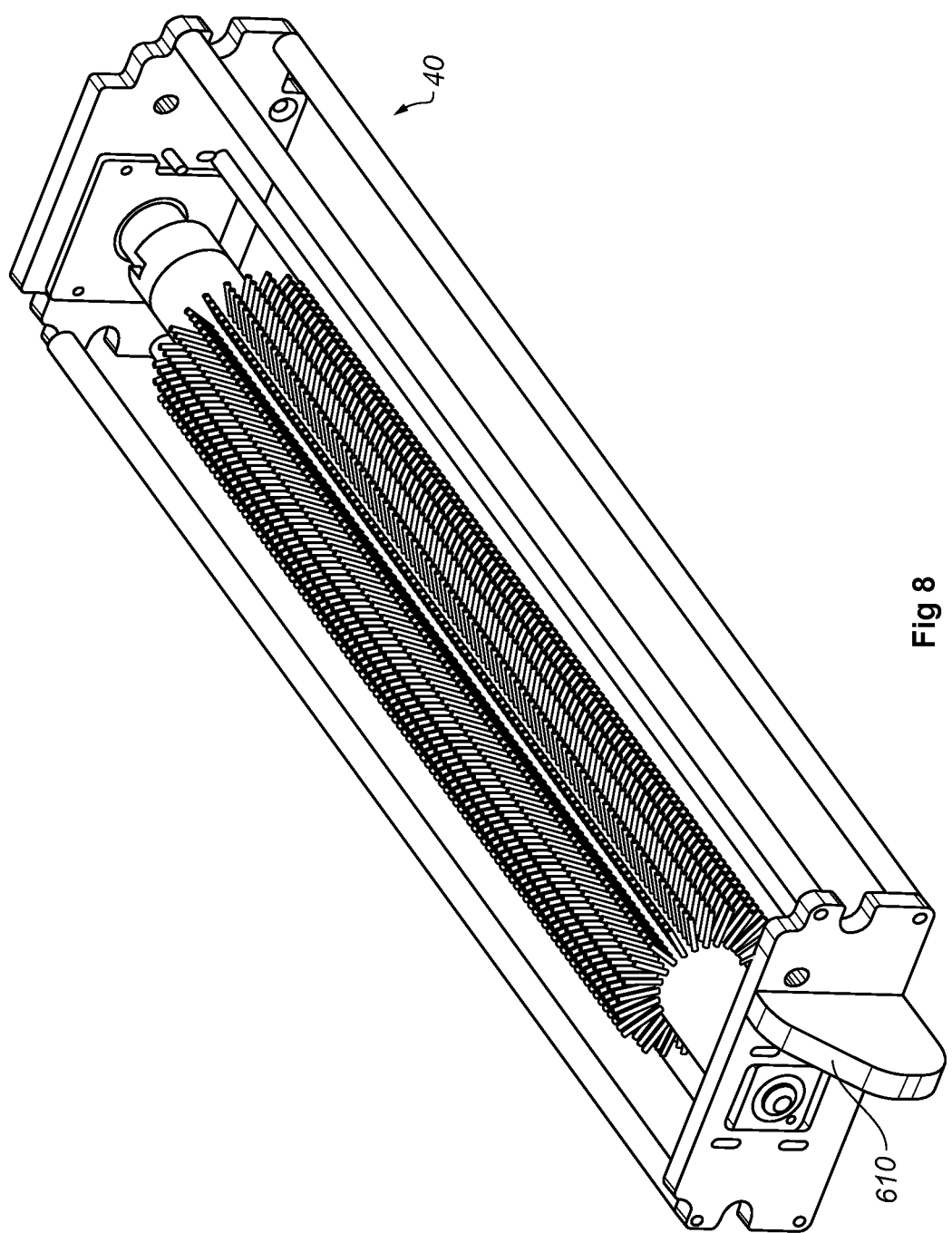
FIG. 8 is an isometric rear view of the removable cartridge assembly showing the belt lift cam.

With reference to FIG. 8, a belt lift cam 61 is shown. The belt lift cam 61 extends distally as a flange from the removable cartridge 40. The belt lift cam 61 provides an upward vertical force to the lower run 12 when the cartridge is inserted, thereby allowing easier insertion of the cartridge 40 and obviating any need for an operator to make adjustments to the lower run 12.

Figure 9:
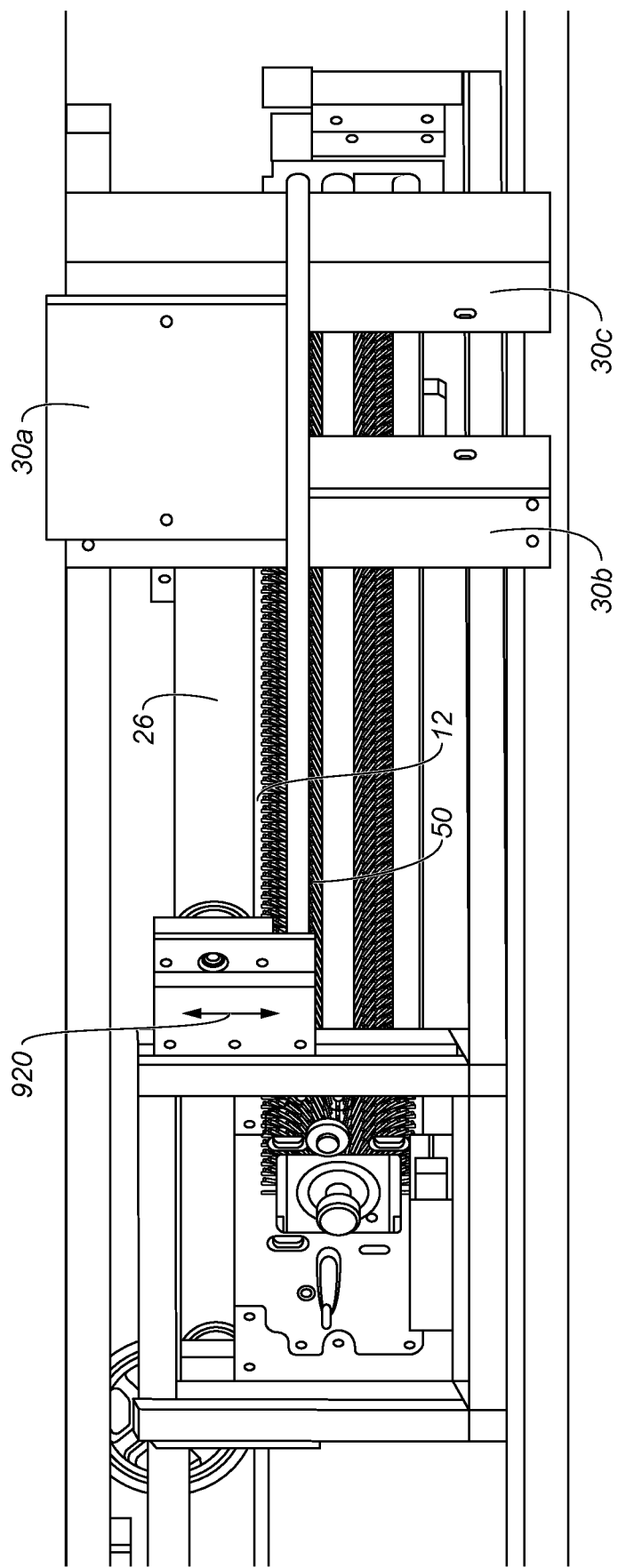
FIG. 9 is a schematic illustration showing the operation of the adjustable pinch rollers.
Figure 10:
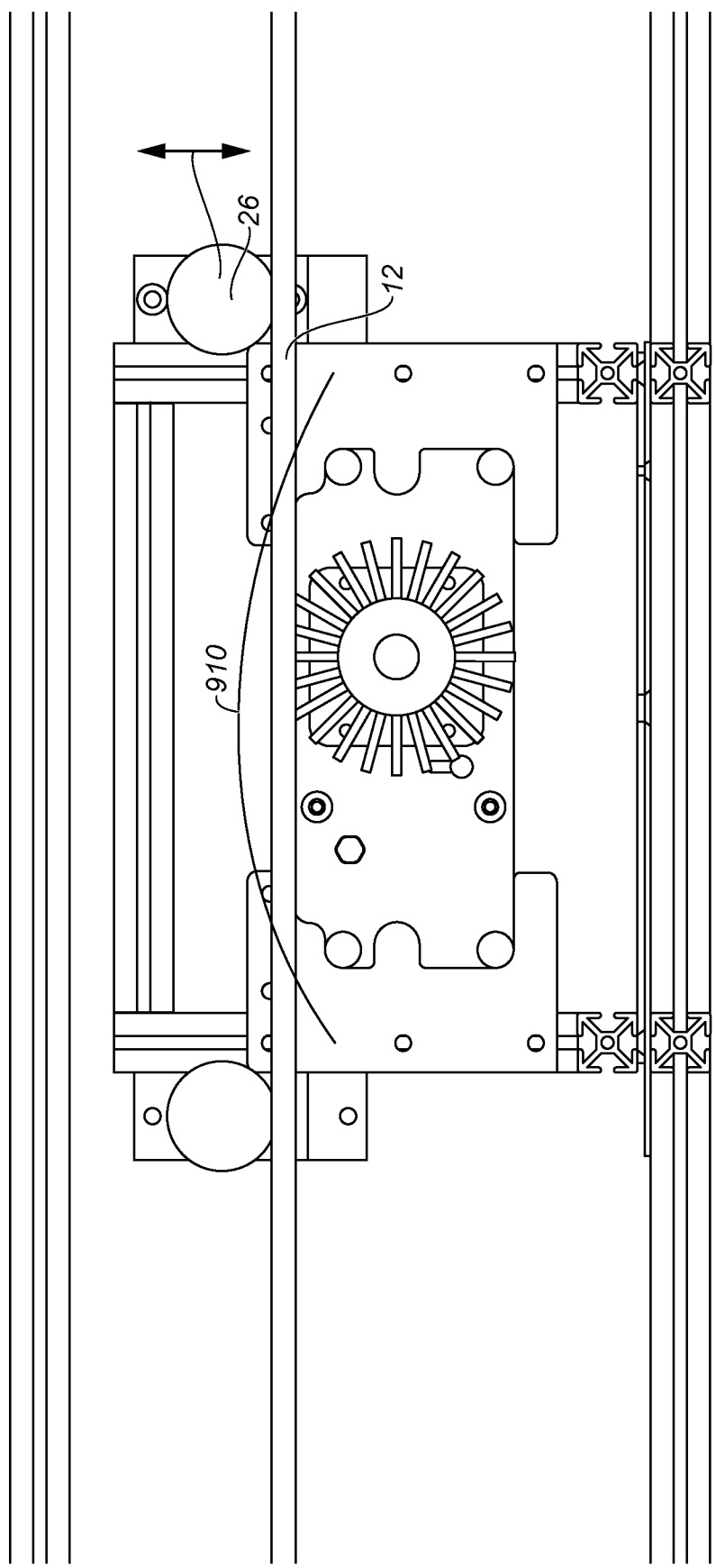
FIG. 10 is a sectional view of the dry brush conveyor cleaning belt system showing the adjustable belt pinch rollers.

With respect to FIGS. 9 and 10, one of the pair of pinch rollers 26 is shown with respect to both the cleaner 50 and conveyor belt 12. The roller 26 can be adjusted by means of a mechanical latch mechanism 920 to increase or decrease the curve of a belt wrapping arc 910 at which the underside of the return run 12b contacts the cleaner 50, thereby increasing or decreasing the downward pressure of arcuic contact with the belt 12 on the cleaner. In an embodiment of the present invention, rollers can be adjusted by means of a slot mechanism and secured by bolts. As shown in FIG. 10, the pair of rollers 26 provides downward pressure on the belt 12, thereby increasing or decreasing the curve of the belt wrapping arc 910 and the corresponding pressure at which the cleaning elements 610 contact the conveyor belt 12. By adjusting the position of the rollers 26, downward pressure can be modulated to increase cleaning efficacy for differing types of debris.

Figure 11:
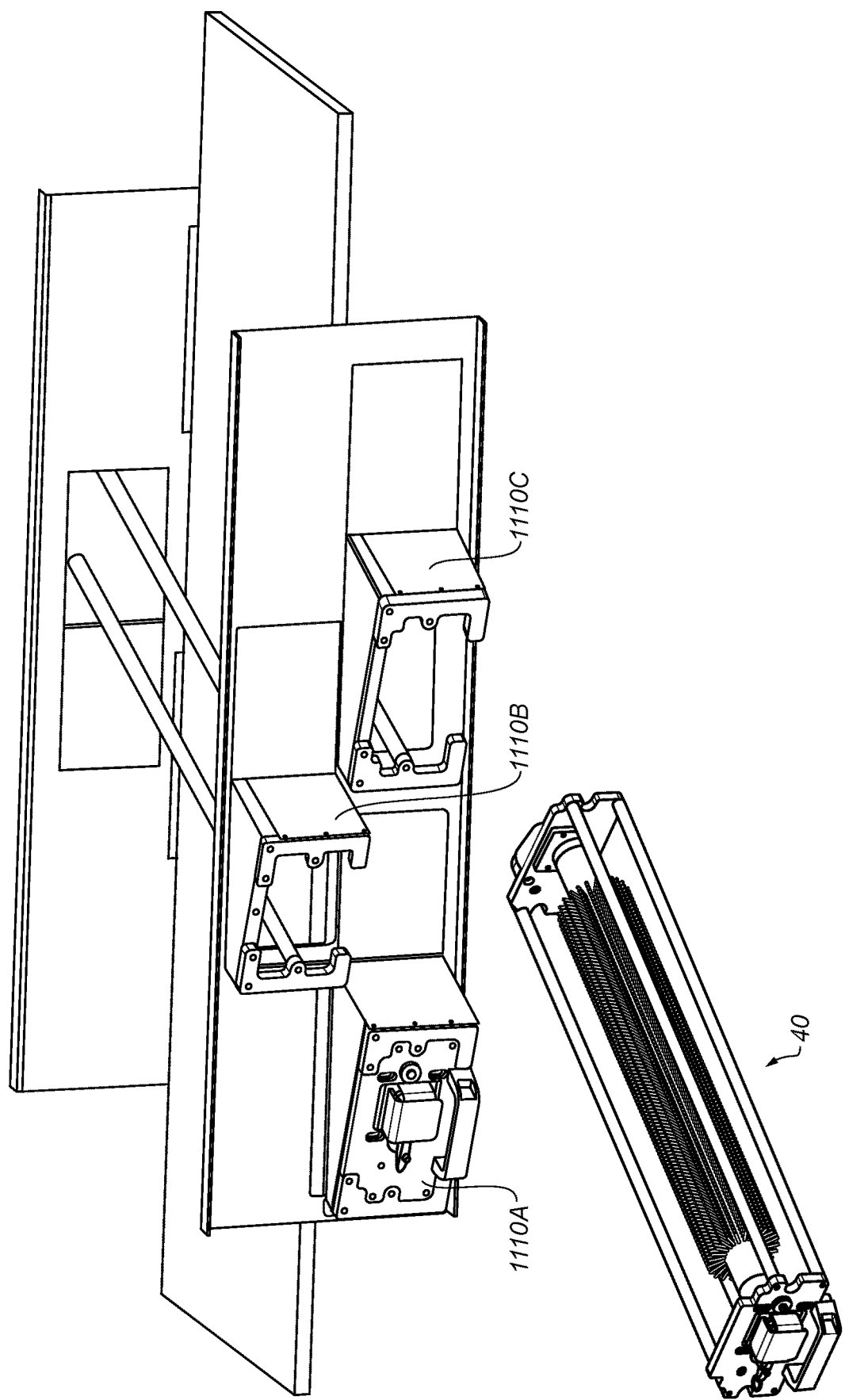
FIG. 11 is a sectional view showing a pivoting multiple head embodiment.

FIG. 11 shows a second embodiment having a plurality of cleaning head housings 1110 (a,b,c) pivotable with respect to the lateral direction of the belt 12. The first cleaning head housing 1110(*b*) is disposed above the lower run of the belt 12 and the second and third housings 1110(*a,c*) are disposed below the lower run 12 of the belt. The housings 1110(*a,b,c*) are pivotable at an angle 21 and operable to each receive a cartridge 40. The pivoting motion of the cleaning head housings 1110 can be linked so that the housings 1110 move in unison. In alternative embodiments of the present invention, the cartridges 40 may be synchronized so that the cleaners 50 move in the same or opposite directions at a particular speed, for example, at the same speed or at a relative speed determined as a function of another cleaner 50.

Figure 12:
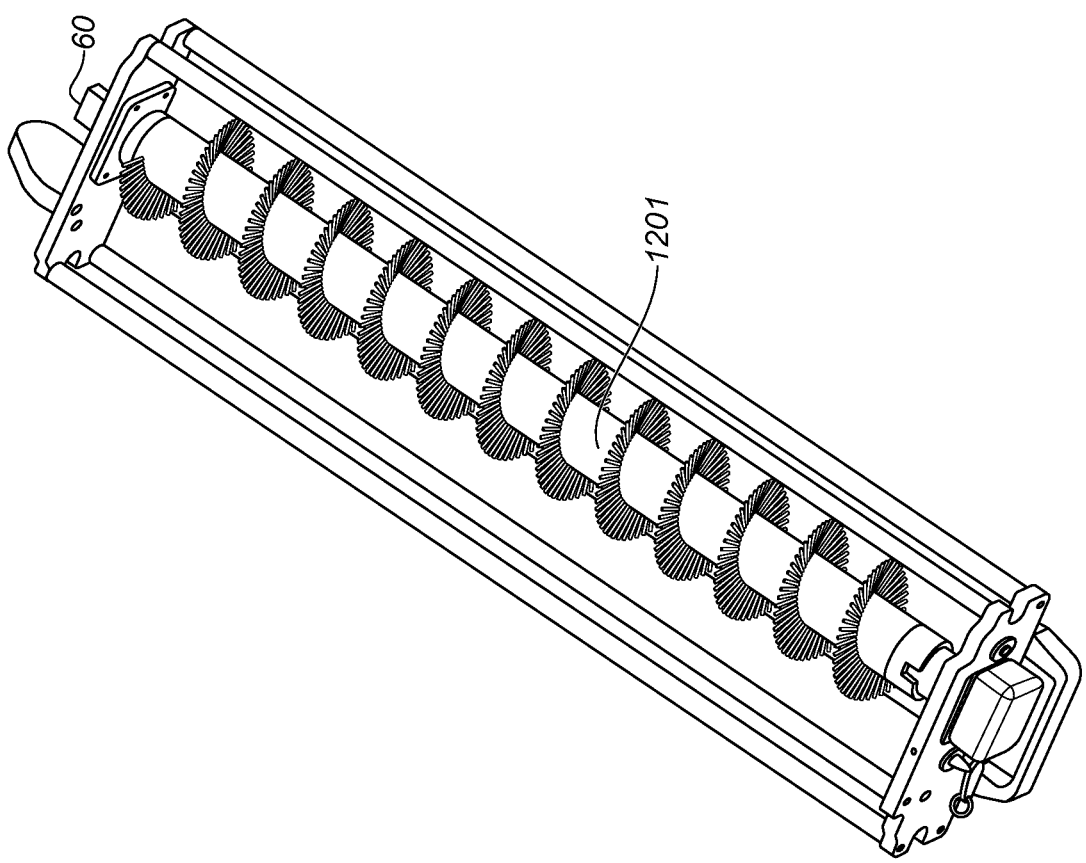
FIG. 12 is a sectional view of a helical brush embodiment.
Figure 13:
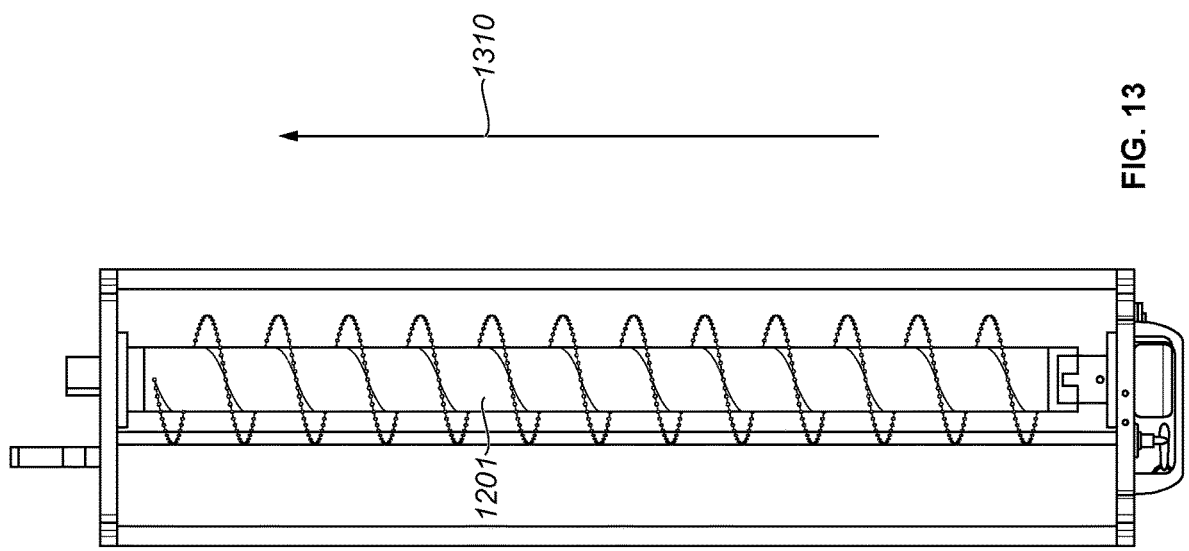
FIG. 13 is a sectional view of an auger brush embodiment.

With respect to FIGS. 12 and 13, a helical brush 1201 is shown. The helical brush 1210 is driven by a first motor 60 so that debris are laterally disposed by auger motion of the helical bush in a first direction 1310 lateral to the cleaner 50.

FIGS. 14 and 15 show a cleaner 50 driven by a first 60 and second motor 61, respectively, the motors 60, 61 each attached to the cartridge 40. The first motor 60 is, for example, formed as a square motor. The second motor 61 can be, for example, in the shape of a cylinder. The first and second motors 60,61 could each be configured to operate more efficiently with differing brush shapes, such as a helical shape or an auger shape.

Figure 16:
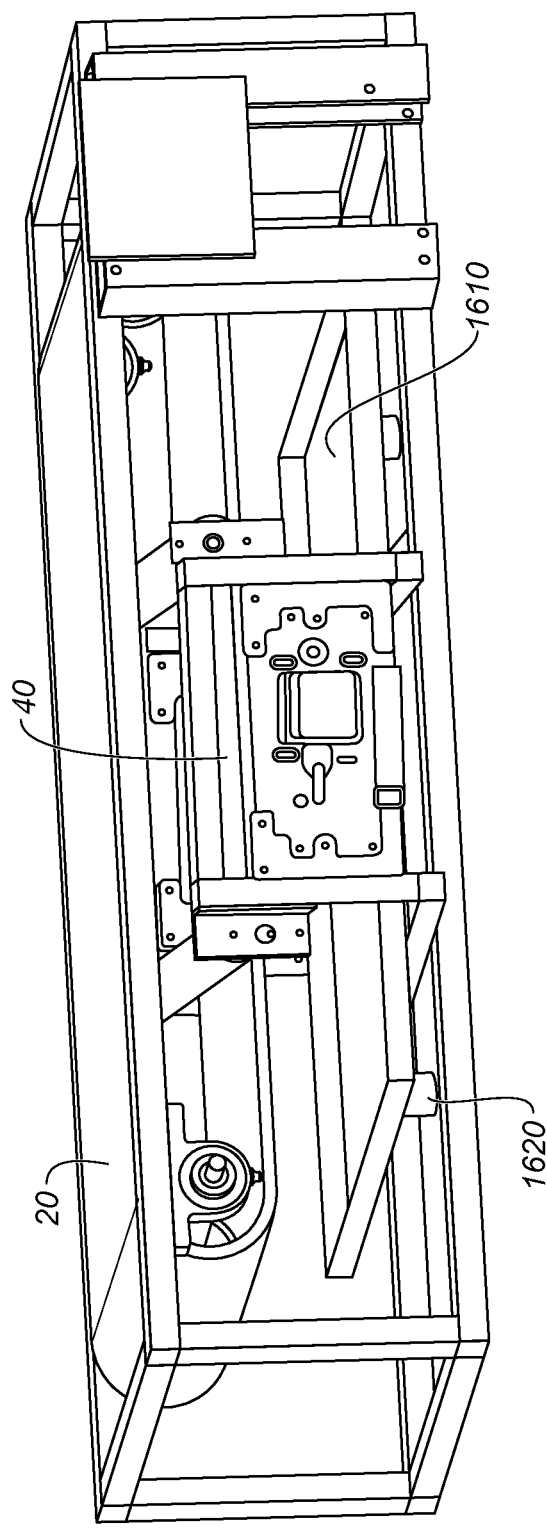
FIG. 16 shows a isometric side view of a vacuum pan enclosure.

In FIG. 16, a vacuum pan 1610 is disposed below the run 20. The vacuum pan 1610 catches debris removed by the cartridge assembly 40 for further removal of debris through a vacuum port 1620. The vacuum port 1620 uses negative pressure to remove debris from the vacuum pan 1610.

Figure 17:
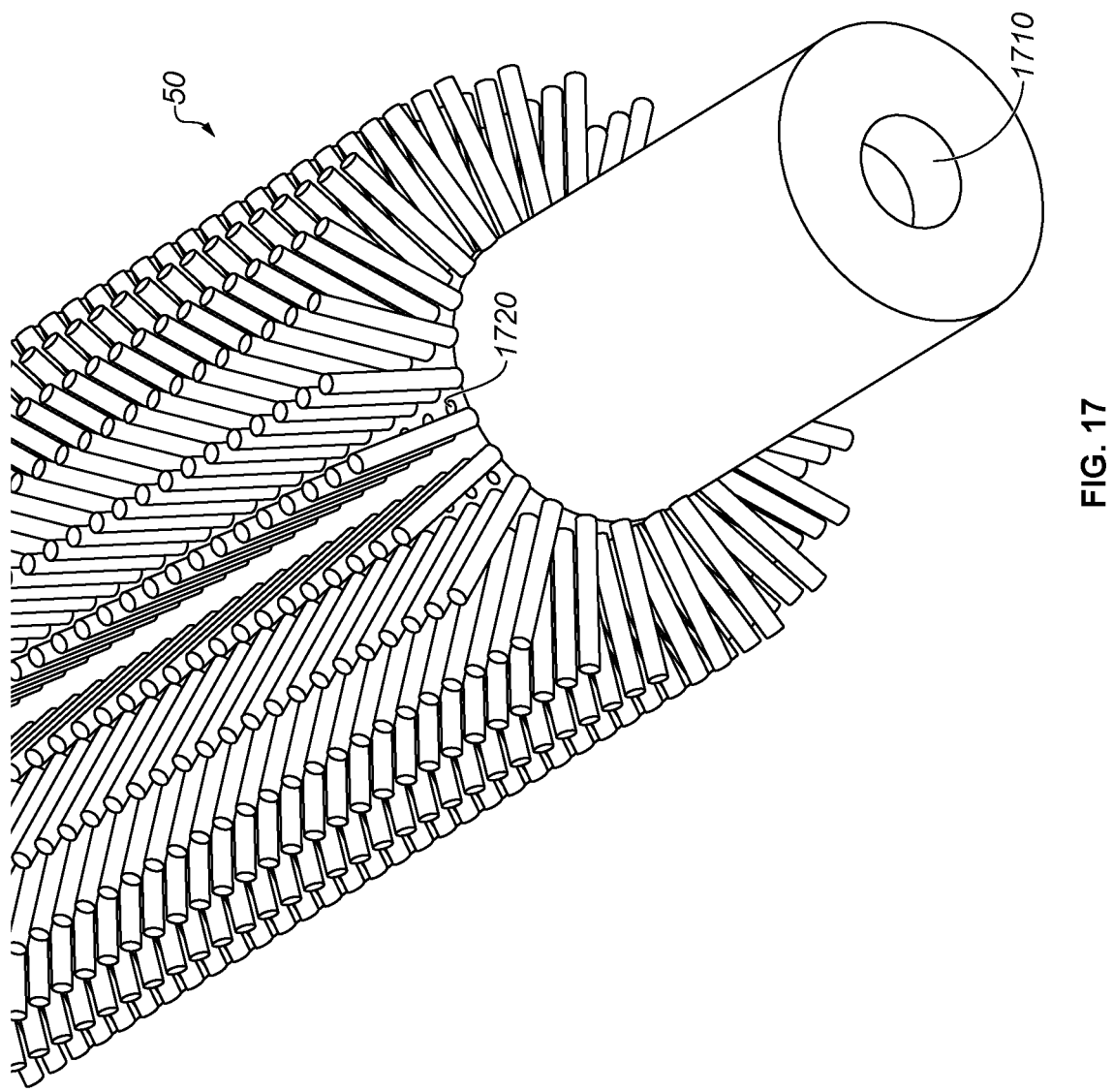
FIG. 17 shows a schematic illustration of the hollow brush arrangement having fluid ports laterally disposed.
Figure 18:
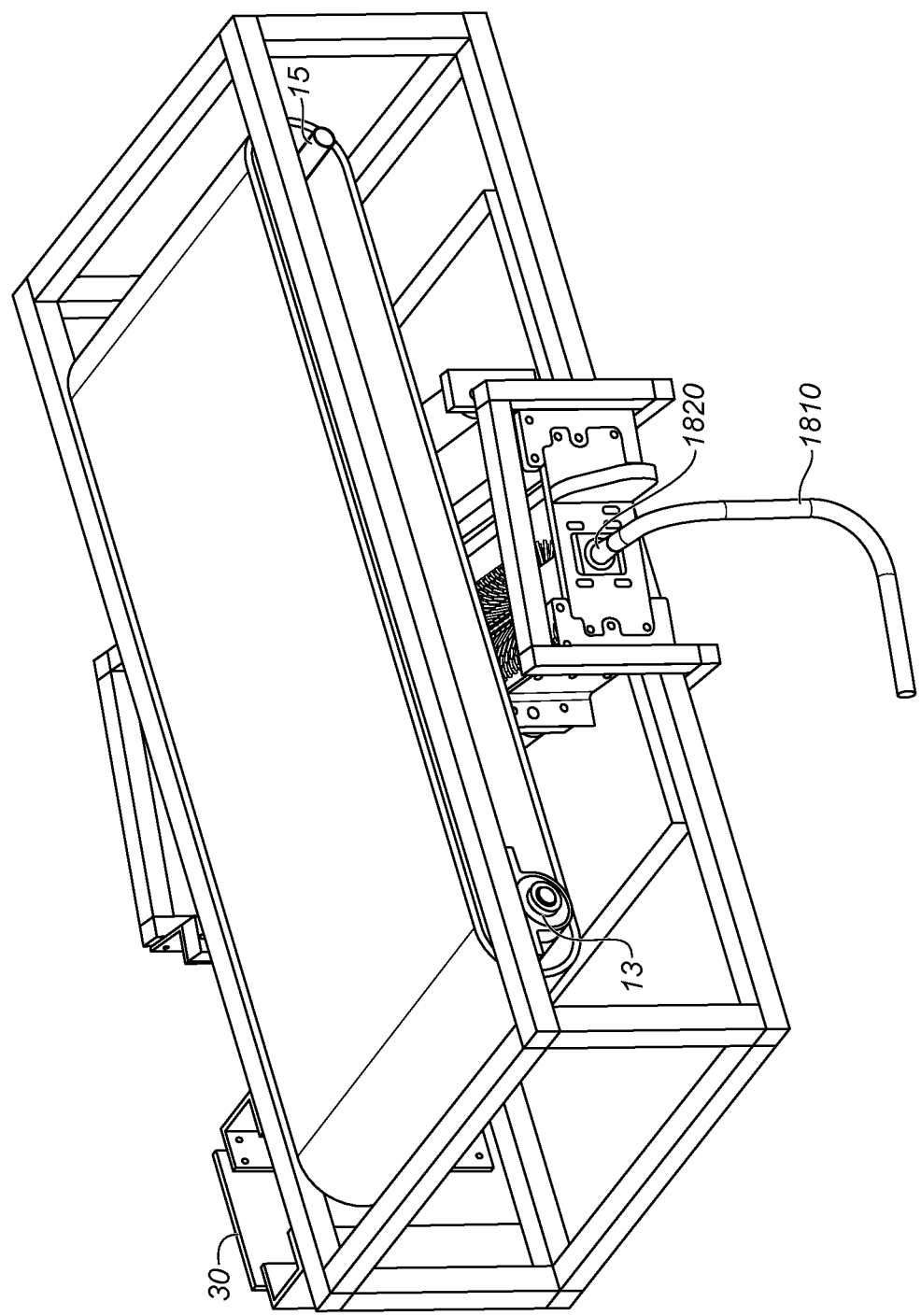
FIG. 18 shows an isometric view of an embodiment of the pivotable assembly with fluid feed lines.

Turning to FIGS. 17 and 18, an cleaner 50 operable to spray fluid on the run 12 is shown. Fluid under pressure is directed into a hollow brush 1710 by a fluid feed line 1810 affixed to the cartridge 40 by a fluid swivel union 1820. Positive fluid pressure forcibly ejects fluid from axially disposed fluid ports 1720 generating a cleaning action on the run 12.

While the invention has been described by reference to various specific embodiments, it should be understood that numerous changes may be made within the spirit and scope of the inventive concepts described. Accordingly, it is intended that the invention is not limited to the described embodiments but will have full scope defined by the language of the following claims.

What is claimed is:

1. A cleaning device for a continuous conveyor having an upper conveyor run and a lower conveyor run comprising:
   a cleaning assembly mounted below said lower conveyor run, wherein said cleaning assembly is pivotable to form an angle with respect to a direction of the lower conveyor run, said cleaning assembly further comprising:
      a removable cartridge having a shaft with a pair of ends and having a cylindrical cleaner for removing particulate matter mounted on said shaft, said cylindrical cleaner being in contact with said lower conveyor run at the angle of said cleaning assembly; and
      a cleaning rod in contact with said cylindrical cleaner.

2. The cleaning device of claim 1 wherein said cylindrical cleaner comprises a brush, said brush having a cylindrical shaft and brush elements extending distally from said shaft.

3. The cleaning device of claim 2 wherein said brush elements extend in helical arrangement.

4. The cleaning device of claim 2 wherein said brush elements form an auger, said auger operable to remove particulate matter by an auger sweeping motion.

5. The cleaning device of claim 2 wherein said brush comprises an hollow cavity, said hollow cavity having a plurality of axially displaced holes.

6. The cleaning device of claim 1 wherein said removable cartridge indicates a type of cylindrical cleaner.

7. The cleaning device of claim 1 wherein said removable cartridge indicates a type of rod.

8. The cleaning device of claim 1 wherein said cleaning assembly further comprises a plurality of rollers, said rollers being operable to increase and decrease a pressure between said cylindrical cleaner and said lower conveyor run.

9. The cleaning device of claim 1 wherein said removable cartridge further comprises a mechanical means for removing and securing said cylindrical cleaner.

10. The cleaning device of claim 9 wherein said mechanical means is a handle.

11. The cleaning device of claim 1 wherein said cylindrical cleaner further comprises a mechanical means for removing and securing said rod.

12. The cleaning device of claim 1 wherein said cleaning assembly further comprises a motor for producing a drive for said cylindrical cleaner.

13. The cleaning device of claim 1 wherein a point of contact between said cylindrical cleaner and said lower conveyor run produces a drive for said cylindrical cleaner.

14. The cleaning device of claim 1 further comprising a vacuum for removing particulate matter from said cleaning assembly.

15. The cleaning device of claim 1 further comprising a second cleaning assembly mounted above said upper conveyor run, wherein said cleaning assembly is pivotable to form an angle with respect to a direction of the upper conveyor run.

16. The cleaning device of claim 1 where in the cylindrical cleaner is removable.

17. A cleaning device for a continuous conveyor having an upper conveyor run and a lower conveyor run comprising:
   a cleaning assembly mounted above said upper conveyor run, wherein said cleaning assembly is pivotable to form an angle with respect to a direction of the upper conveyor run, said cleaning assembly further comprising:
      a removable cartridge having a shaft with a pair of ends and having a cylindrical cleaner for removing particulate matter mounted on said shaft, said cylindrical cleaner being in contact with said upper conveyor run at the angle of said cleaning assembly; and
      a cleaning rod in contact with said cylindrical cleaner.

18. The cleaning device of claim 17 wherein said cylindrical cleaner comprises a brush, said brush having a cylindrical shaft and brush elements extending distally from said shaft.

19. The cleaning device of claim 18 wherein said brush elements extend in helical arrangement.

20. The cleaning device of claim 18 wherein said brush elements form an auger, said auger operable to remove particulate matter by an auger sweeping motion.

21. The cleaning device of claim 18 wherein said brush comprises an hollow cavity, said hollow cavity having a plurality of axially displaced holes.

22. The cleaning device of claim 17 wherein said removable cartridge indicates a type of cylindrical cleaner.

23. The cleaning device of claim 17 wherein said removable cartridge indicates a type of rod.

24. The cleaning device of claim 17 wherein said cleaning assembly further comprises a plurality of rollers, said rollers being operable to increase and decrease a pressure between said cylindrical cleaner and said lower conveyor run.

25. The cleaning device of claim 17 wherein said removable cartridge further comprises a mechanical means for removing and securing said cylindrical cleaner.

26. The cleaning device of claim 25 wherein said mechanical means is a handle.

27. The cleaning device of claim 17 wherein said cylindrical cleaner further comprises a mechanical means for removing and securing said rod.

28. The cleaning device of claim 17 wherein said cleaning assembly further comprises a motor for producing a drive for said cylindrical cleaner.

29. The cleaning device of claim 17 wherein a point of contact between said cylindrical cleaner and said lower conveyor run produces a drive for said cylindrical cleaner.

30. The cleaning device of claim 17 further comprising a vacuum for removing particulate matter from said cleaning assembly.

31. The cleaning device of claim 17 further comprising a second cleaning assembly mounted below said lower conveyor run, wherein said cleaning assembly is pivotable to form an angle with respect to a direction of the lower conveyor run.

32. The cleaning device of claim 17 wherein the cylindrical cleaner is removable.

33. A cleaning device for a continuous conveyor having an upper conveyor run and a lower conveyor run comprising:
  a first cleaning assembly mounted above said upper conveyor run, wherein said first cleaning assembly is pivotable to form an angle with respect to a direction of the upper conveyor run, said first cleaning assembly further comprising:
    a first removable cartridge having a shaft with a pair of ends and having a first cylindrical cleaner for removing particulate matter mounted on said shaft, said first cylindrical cleaner being in contact with said upper conveyor run at the angle of said first cleaning assembly; and
    a first cleaning rod in contact with said first cylindrical cleaner;
  a second cleaning assembly mounted below said lower conveyor run, wherein said second cleaning assembly is pivotable to form an angle with respect to a direction of the lower conveyor run, said second cleaning assembly further comprising:
    a second removable cartridge having a shaft with a pair of ends and having a second cylindrical cleaner for removing particulate matter mounted on said shaft, said second cylindrical cleaner being in contact with said upper conveyor run at the angle of said cleaning assembly; and
    a second cleaning rod in contact with said second cylindrical cleaner.

34. The cleaning device of claim 33 wherein said first and second cylindrical cleaner comprises a brush, said brush having a cylindrical shaft and brush elements extending distally from said shaft.

35. The cleaning device of claim 33 wherein said brush elements extend in helical arrangement.

36. The cleaning device of claim 33 wherein said brush elements form an auger, said auger operable to remove particulate matter by an auger sweeping motion.

37. The cleaning device of claim 33 wherein said brush comprises an hollow cavity, said hollow cavity having a plurality of axially displaced holes.

38. The cleaning device of claim 33 wherein said first and second removable cartridge indicates a type of cylindrical cleaner.

39. The cleaning device of claim 33 wherein said first and second removable cartridge indicates a type of rod.

40. The cleaning device of claim 33 wherein said first and second cleaning assembly further comprises a plurality of rollers, said rollers being operable to increase and decrease a pressure between said cylindrical cleaner and said lower conveyor run.

41. The cleaning device of claim 33 wherein said first and second removable cartridge further comprises a mechanical means for removing and securing said cylindrical cleaner.

42. The cleaning device of claim 41 wherein said mechanical means is a handle.

43. The cleaning device of claim 33 wherein said first and second cylindrical cleaner further comprises a mechanical means for removing and securing said rod.

44. The cleaning device of claim 33 wherein said first and second cleaning assembly further comprises a motor for producing a drive for said cylindrical cleaner.

45. The cleaning device of claim 33 wherein a point of contact between said first and second cylindrical cleaner and said lower conveyor run produces a drive for said first and second cylindrical cleaner.

46. The cleaning device of claim 33 further comprising a vacuum for removing particulate matter from said first and second cleaning assemblies.

47. The cleaning device of claim 33 wherein the first and second cylindrical cleaner is removable.

48. A system for cleaning a continuous conveyor comprising:
  a continuous conveyor having an upper conveyor run and a lower conveyor run; and
  a cleaning assembly mounted below said lower conveyor run, wherein said cleaning assembly is pivotable to form an angle with respect to a direction of the lower conveyor run, said cleaning assembly further comprising:
    a removable cartridge having a shaft with a pair of ends and having a cylindrical cleaner for removing particulate matter mounted on said shaft, said cylindrical cleaner being in contact with said lower conveyor run at the angle of the cleaning assembly; and
    a cleaning rod in contact with said cylindrical cleaner.

49. The cleaning system of claim 48 wherein said cylindrical cleaner comprises a brush, said brush having a cylindrical shaft and brush elements extending distally from said shaft.

50. The cleaning system of claim 49 wherein said brush elements extend in helical arrangement.

51. The cleaning system of claim 49 wherein said brush elements form an auger, said auger operable to remove particulate matter by an auger sweeping motion.

52. The cleaning system of claim 49 wherein said brush comprises an hollow cavity, said hollow cavity having a plurality of axially displaced holes.

53. The cleaning system of claim 48 wherein said removable cartridge indicates a type of cylindrical cleaner.

54. The cleaning system of claim 48 wherein said removable cartridge indicates a type of rod.

55. The cleaning system of claim 48 wherein said cleaning assembly further comprises a plurality of rollers, said rollers being operable to increase and decrease a pressure between said cylindrical cleaner and said lower conveyor run.

56. The cleaning system of claim 48 wherein said removable cartridge further comprises a mechanical means for removing and securing said cylindrical cleaner.

57. The cleaning system of claim 56 wherein said mechanical means is a handle.

58. The cleaning system of claim 48 wherein said cylindrical cleaner further comprises a mechanical means for removing and securing said rod.

59. The cleaning system of claim 48 wherein said cleaning assembly further comprises a motor for producing a drive for said cylindrical cleaner.

60. The cleaning system of claim 48 wherein a point of contact between said cylindrical cleaner and said lower conveyor run produces a drive for said cylindrical cleaner.

61. The cleaning system of claim 48 further comprising a vacuum for removing particulate matter from said cleaning assembly.

62. The cleaning system of claim 48 further comprising a second cleaning assembly mounted above said upper conveyor run, wherein said cleaning assembly is pivotable to form an angle with respect to a direction of the upper conveyor run.

63. The cleaning device of claim 48 where in the cylindrical cleaner is removable.

64. A method for cleaning a continuous conveyor having an upper conveyor run and a lower conveyor run, comprising the steps of:
mounting a cleaning assembly below said lower conveyor run;
pivoting said cleaning assembly to form an angle with respect to a direction of travel of said lower conveyor run;
inserting a removable cartridge having a shaft with a pair of ends and having a cylindrical cleaner mounted on said shaft, said cylindrical cleaner being in contact with said lower conveyor run at an angle of said cleaning assembly and a cleaning rod in contact with said cylindrical cleaner; and
activating said continuous conveyor to cause said cylindrical cleaner to remove particulate matter from said lower conveyor run.

65. A cleaning device for a continuous conveyor having an upper conveyor run and a lower conveyor run comprising:
a cleaning assembly mounted below said lower conveyor run, wherein said cleaning assembly is pivotable to form an angle with respect to a direction of the lower conveyor run, said cleaning assembly further comprising:
a removable cartridge having a shaft with a pair of ends and having a cylindrical cleaner for removing particulate matter mounted on said shaft, said cylindrical cleaner being in contact with said lower conveyor run at the angle of said cleaning assembly; and
a cleaning rod in contact with said cylindrical cleaner;
wherein said cylindrical cleaner comprises a brush, said brush having a cylindrical shaft and brush elements extending distally from said shaft;
wherein said brush elements extend in helical arrangement; wherein said brush elements form an auger, said auger operable to remove particulate matter by an auger sweeping motion; wherein said removable cartridge indicates a type of cylindrical cleaner; wherein said removable cartridge indicates a type of rod; wherein said cleaning assembly further comprises a plurality of rollers, said rollers being operable to increase and decrease a pressure between said cylindrical cleaner and said lower conveyor run; wherein said removable cartridge further comprises a mechanical means for removing and securing said cylindrical cleaner; wherein said mechanical means is a handle; wherein said cylindrical cleaner further comprises a mechanical means for removing and securing said rod; wherein said cleaning assembly further comprises a motor for producing a drive for said cylindrical cleaner; wherein a point of contact between said cylindrical cleaner and said lower conveyor run produces a drive for said cylindrical cleaner; and wherein the cylindrical cleaner is removable;
said cleaning device further comprising:
further comprising a vacuum for removing particulate matter from said cleaning assembly; a second cleaning assembly mounted above said upper conveyor run, wherein said cleaning assembly is pivotable to form an angle with respect to a direction of the upper conveyor run.

66. A cleaning device for a continuous conveyor having an upper conveyor run and a lower conveyor run comprising:
a cleaning assembly mounted below said lower conveyor run, wherein said cleaning assembly is pivotable to form an angle with respect to a direction of the lower conveyor run, said cleaning assembly further comprising:
a removable cartridge having a shaft with a pair of ends and having a cylindrical cleaner for removing particulate matter mounted on said shaft, said cylindrical cleaner being in contact with said lower conveyor run at the angle of said cleaning assembly; and
a cleaning rod in contact with said cylindrical cleaner;
wherein said cylindrical cleaner comprises a brush, said brush having a cylindrical shaft and brush elements extending distally from said shaft;
wherein said brush elements extend in helical arrangement; wherein said brush elements form an auger, said auger operable to remove particulate matter by an auger sweeping motion; wherein said removable cartridge indicates a type of cylindrical cleaner; wherein said removable cartridge indicates a type of rod; wherein said cleaning assembly further comprises a plurality of rollers, said rollers being operable to increase and decrease a pressure between said cylindrical cleaner and said lower conveyor run; wherein said removable cartridge further comprises a mechanical means for removing and securing said cylindrical cleaner; wherein said mechanical means is a handle; wherein said cylindrical cleaner further comprises a mechanical means for removing and securing said rod; wherein said cleaning assembly further comprises a motor for producing a drive for said cylindrical cleaner; wherein a point of contact between said cylindrical cleaner and said lower conveyor run produces a drive for said cylindrical cleaner; and wherein the cylindrical cleaner is removable;
said cleaning device further comprising:
further comprising a vacuum for removing particulate matter from said cleaning assembly; a second cleaning assembly mounted below said lower conveyor run, wherein said second cleaning assembly is pivotable to form an angle with respect to a direction of the lower conveyor run.

67. A cleaning device for a continuous conveyor having an upper conveyor run and a lower conveyor run comprising:
- a first cleaning assembly mounted above said upper conveyor run, wherein said first cleaning assembly is pivotable to form an angle with respect to a direction of the upper conveyor run, said first cleaning assembly further comprising:
  - a first removable cartridge having a shaft with a pair of ends and having a first cylindrical cleaner for removing particulate matter mounted on said shaft, said first cylindrical cleaner being in contact with said upper conveyor run at the angle of said first cleaning assembly; and
  - a first cleaning rod in contact with said first cylindrical cleaner;
- a second cleaning assembly mounted below said lower conveyor run, wherein said second cleaning assembly is pivotable to form an angle with respect to a direction of the lower conveyor run, said second cleaning assembly further comprising:
  - a second removable cartridge having a shaft with a pair of ends and having a second cylindrical cleaner for removing particulate matter mounted on said shaft, said second cylindrical cleaner being in contact with said upper conveyor run at the angle of said cleaning assembly; and
  - a second cleaning rod in contact with said second cylindrical cleaner;

wherein said cylindrical cleaner comprises a brush, said brush having a cylindrical shaft and brush elements extending distally from said shaft;

wherein said brush elements extend in helical arrangement; wherein said brush elements form an auger, said auger operable to remove particulate matter by an auger sweeping motion; wherein said removable cartridge indicates a type of cylindrical cleaner; wherein said removable cartridge indicates a type of rod; wherein said cleaning assembly further comprises a plurality of rollers, said rollers being operable to increase and decrease a pressure between said cylindrical cleaner and said lower conveyor run; wherein said removable cartridge further comprises a mechanical means for removing and securing said cylindrical cleaner; wherein said mechanical means is a handle; wherein said cylindrical cleaner further comprises a mechanical means for removing and securing said rod; wherein said cleaning assembly further comprises a motor for producing a drive for said cylindrical cleaner; wherein a point of contact between said cylindrical cleaner and said lower conveyor run produces a drive for said cylindrical cleaner; and wherein the cylindrical cleaner is removable;

said cleaning device further comprising:

further comprising a vacuum for removing particulate matter from said cleaning assembly.

* * * * *